April 24, 1962
F. R. KRAUSE
3,030,835
TUBE ROLLING MACHINE
Filed June 6, 1958
13 Sheets-Sheet 1
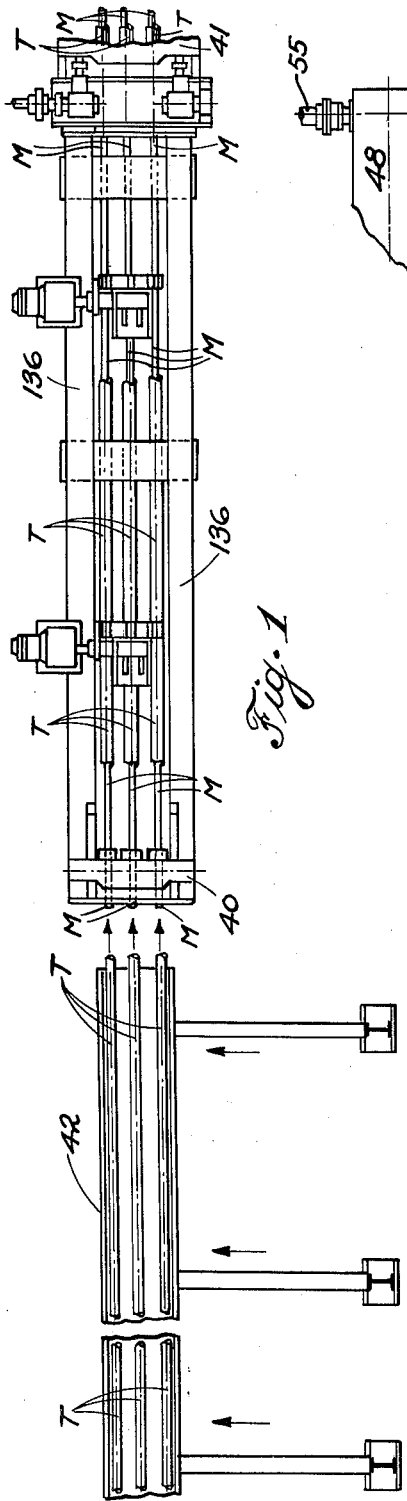
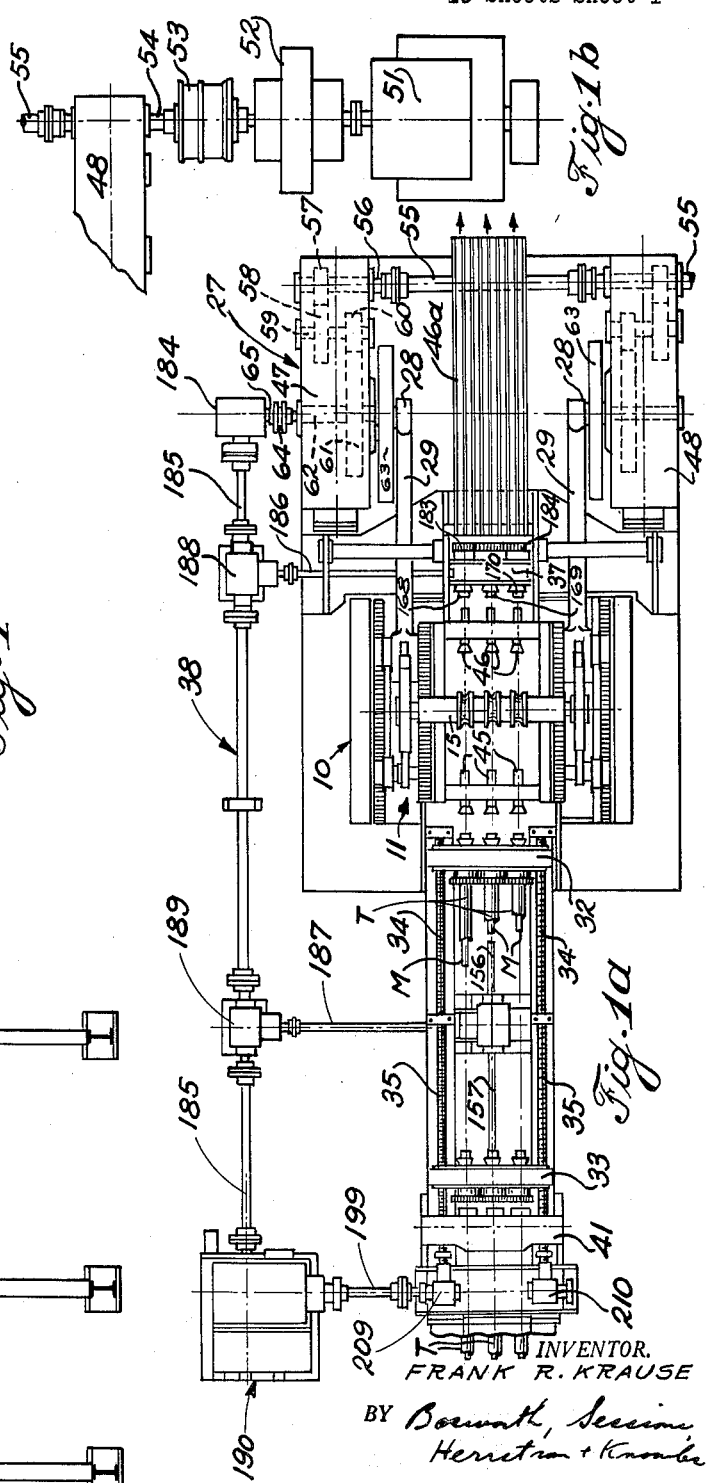
INVENTOR.
FRANK R. KRAUSE
BY
ATTORNEYS April 24, 1962
F. R. KRAUSE
3,030,835
TUBE ROLLING MACHINE
Filed June 6, 1958
13 Sheets-Sheet 2
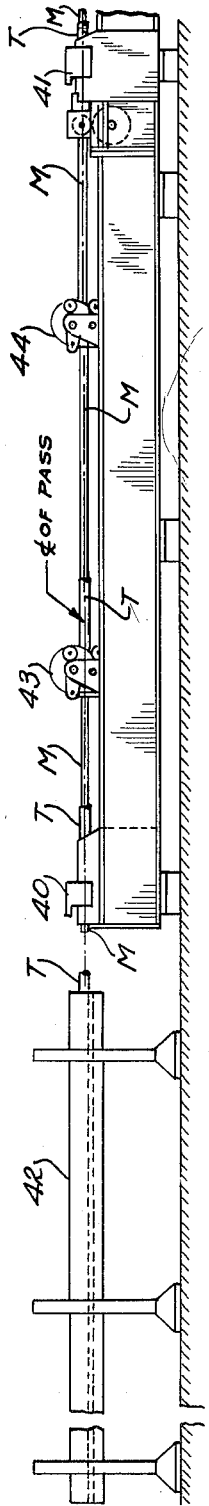
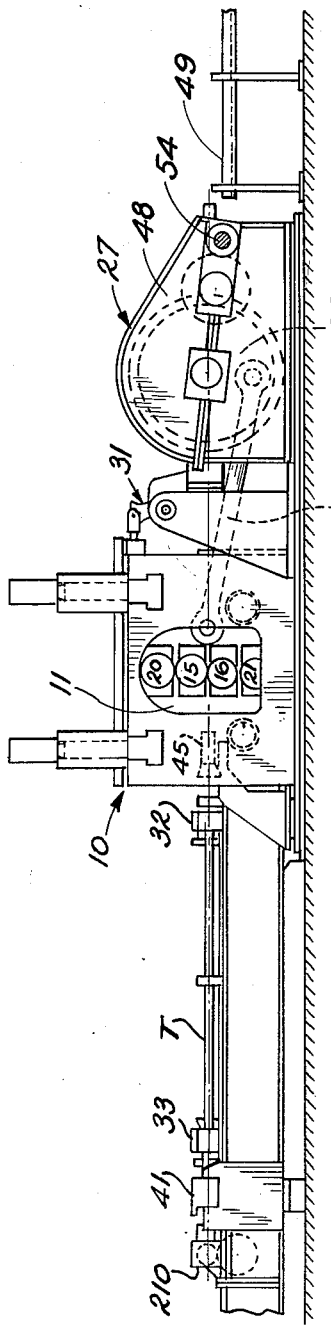
INVENTOR.
FRANK R. KRAUSE
BY Bosworth, Sessions,
Herrstrom & Knowles
ATTORNEYS

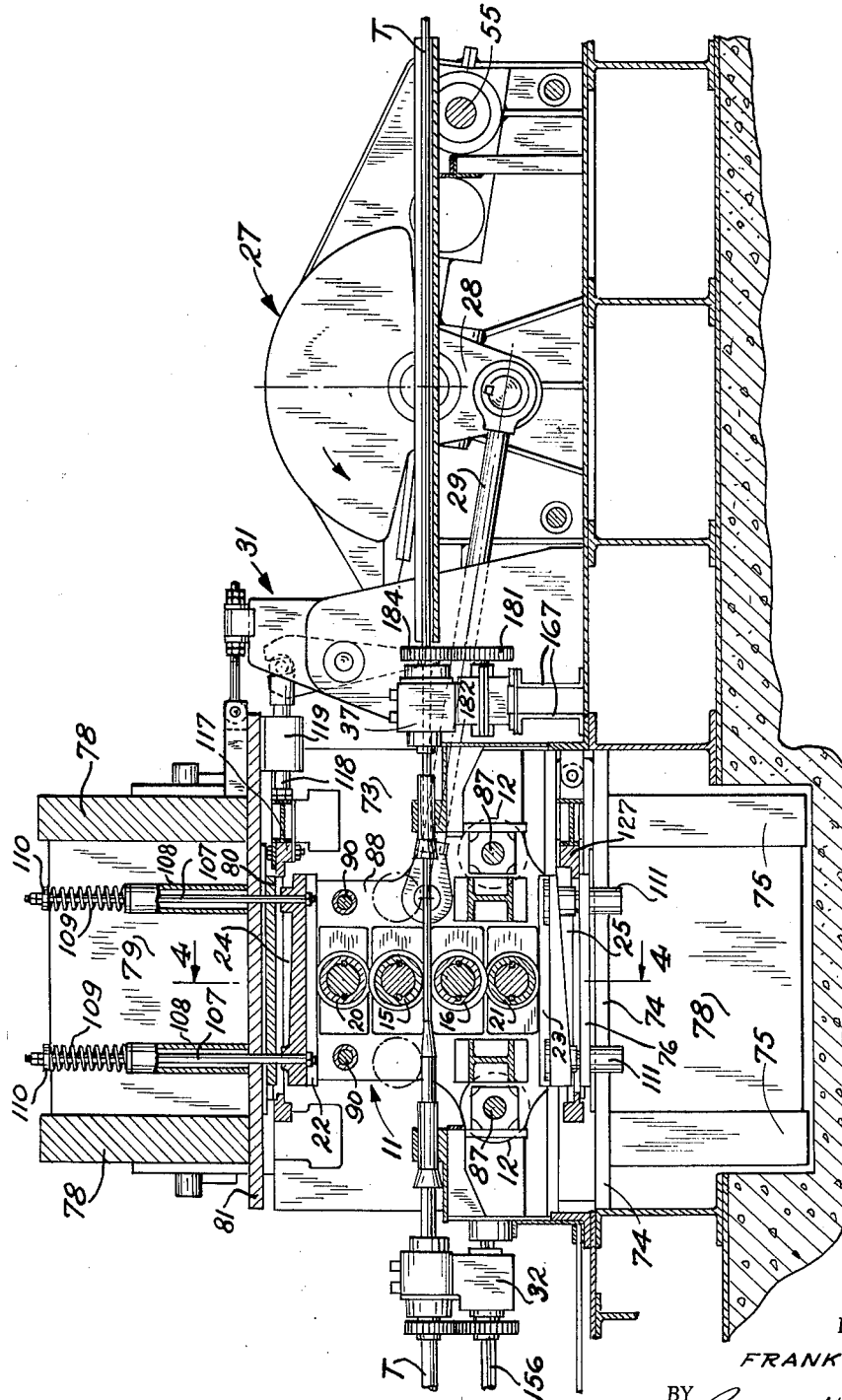

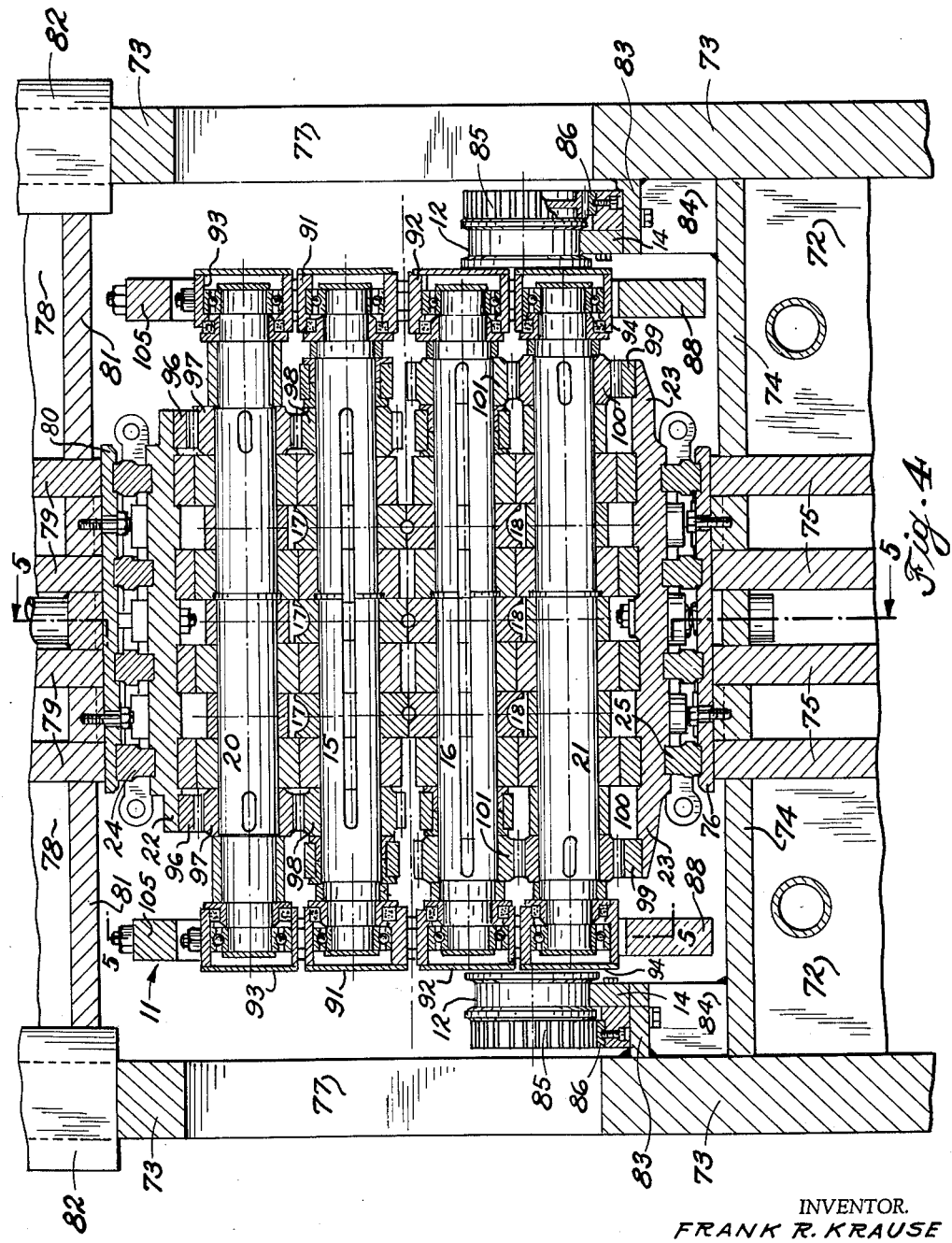

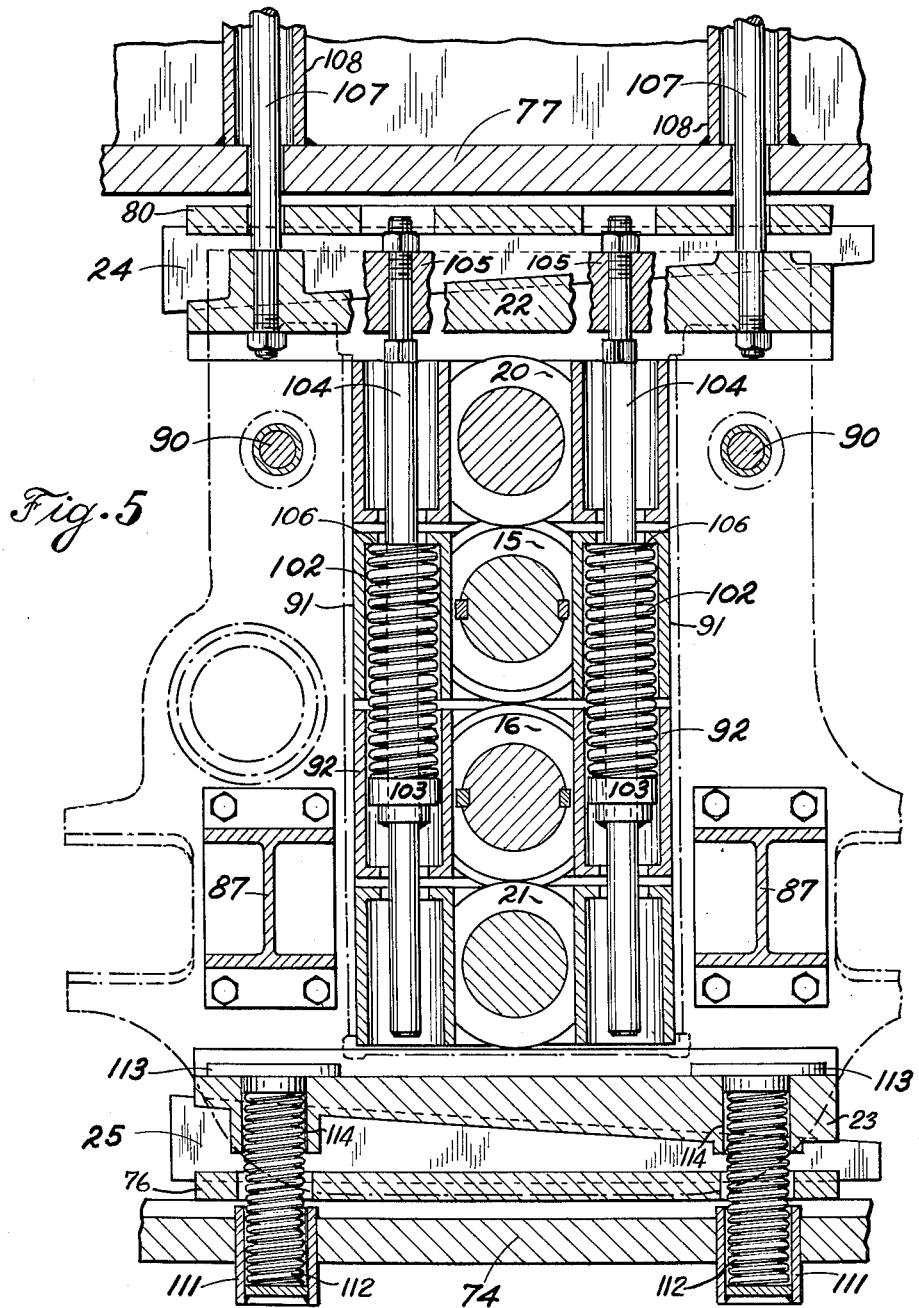

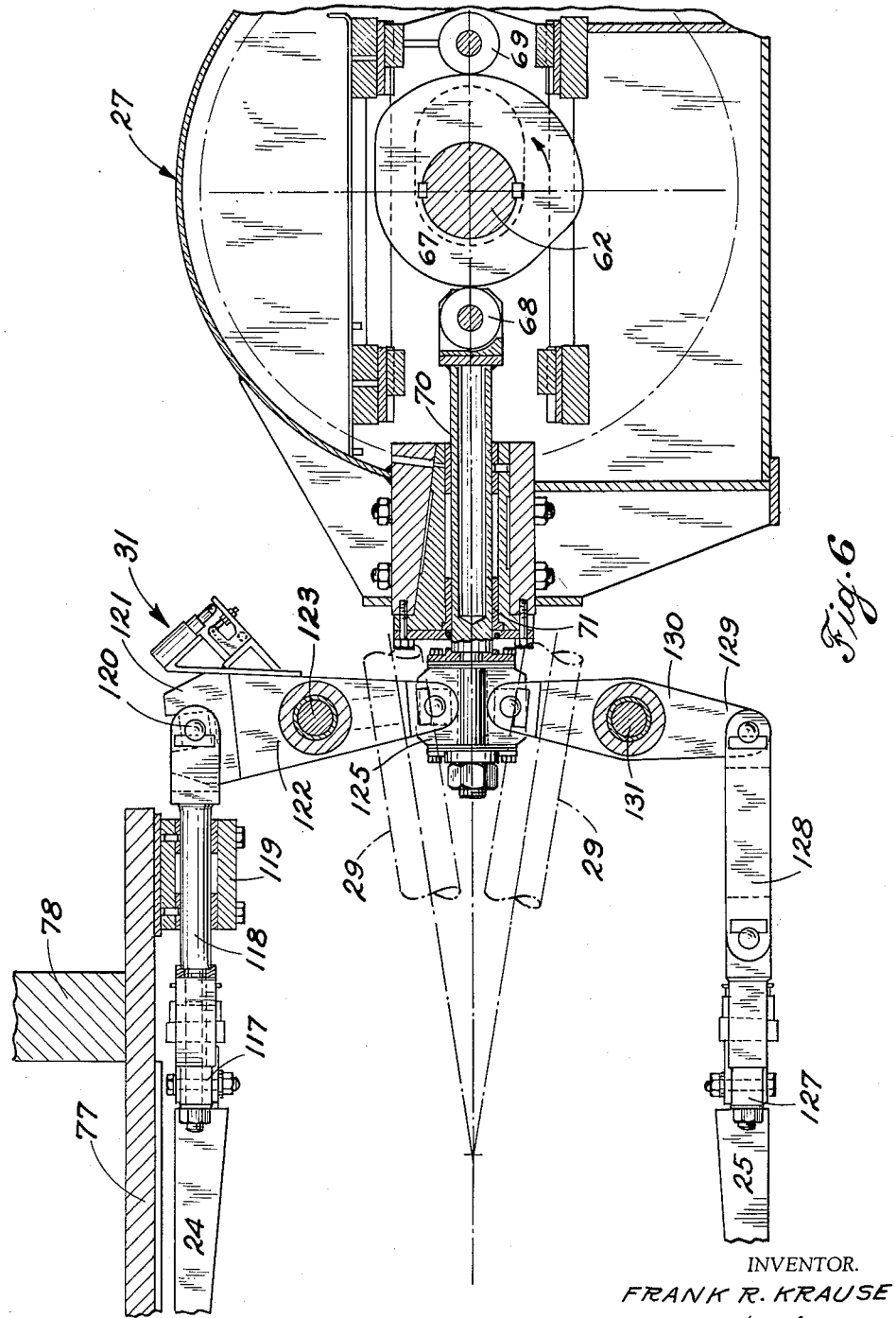

April 24, 1962 F. R. KRAUSE 3,030,835
TUBE ROLLING MACHINE
Filed June 6, 1958 13 Sheets-Sheet 7

INVENTOR.
FRANK R. KRAUSE
BY Bosworth, Sessions,
Hennstrom & Knowles
ATTORNEYS

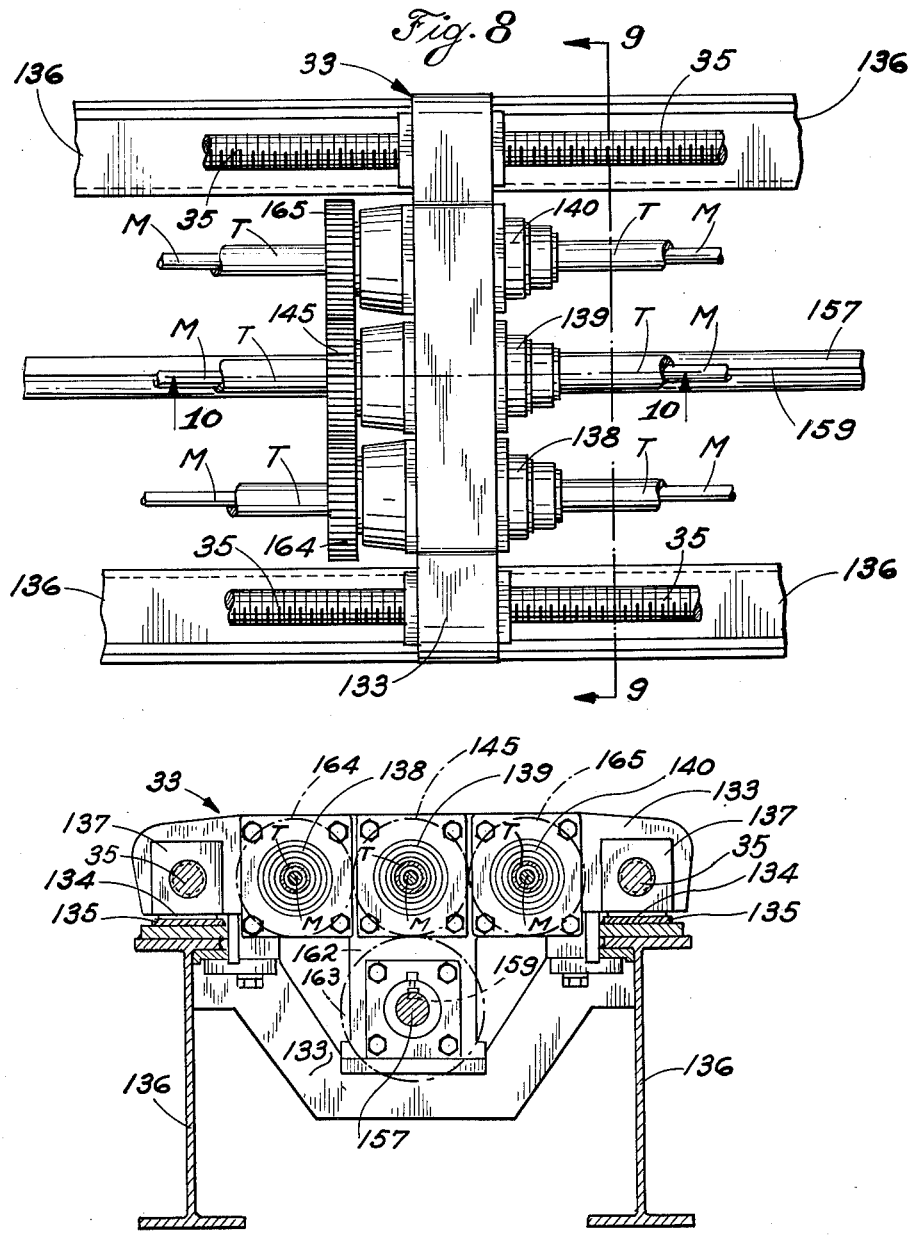

April 24, 1962 F. R. KRAUSE 3,030,835
TUBE ROLLING MACHINE

Filed June 6, 1958 13 Sheets-Sheet 9

INVENTOR.
FRANK R. KRAUSE
BY Bosworth, Sessions,
Herrstrom & Knowles
ATTORNEYS

April 24, 1962  F. R. KRAUSE  3,030,835
TUBE ROLLING MACHINE
Filed June 6, 1958  13 Sheets-Sheet 10
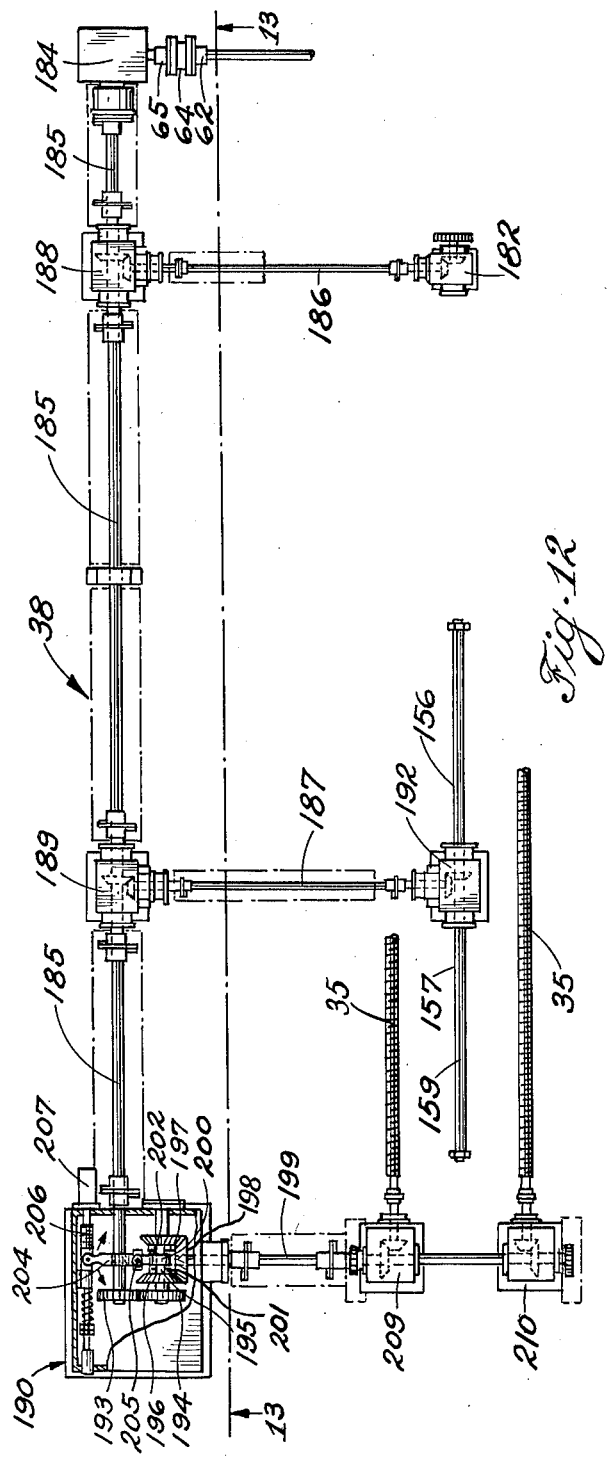
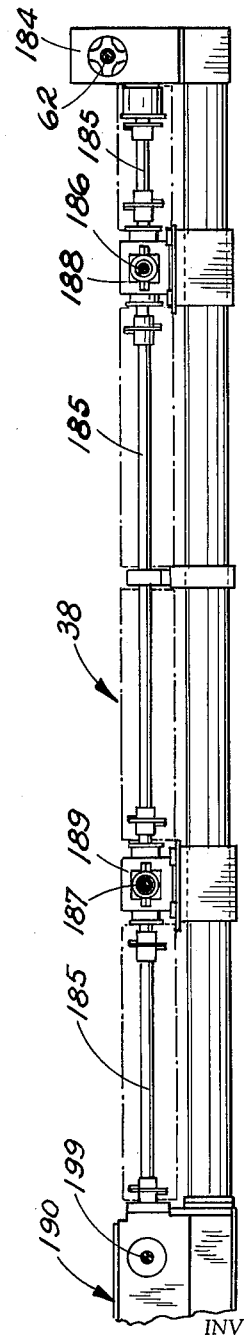
INVENTOR.
FRANK R. KRAUSE
BY Bosworth, Sessions,
Herretson & Knowles
ATTORNEYS

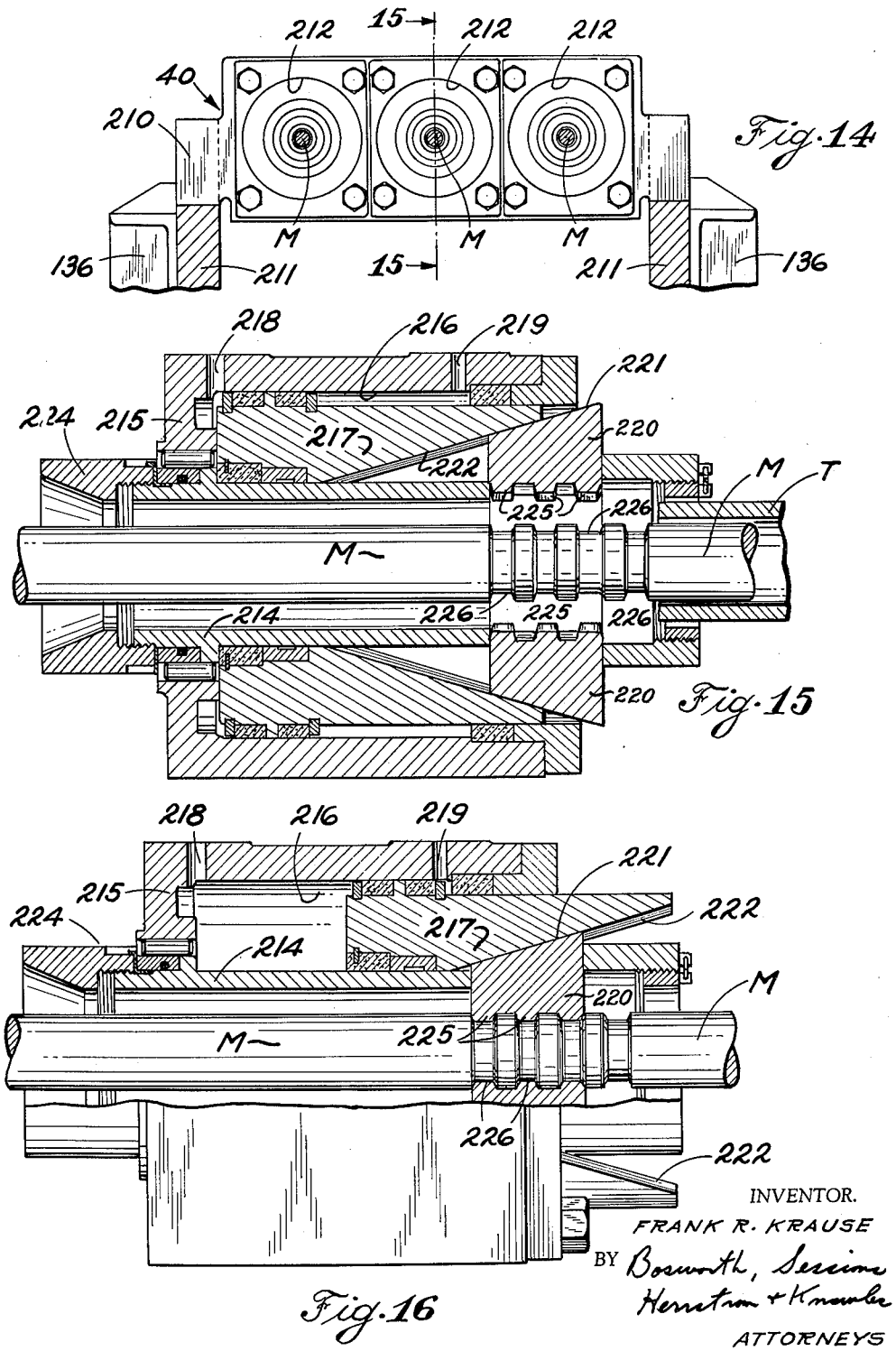

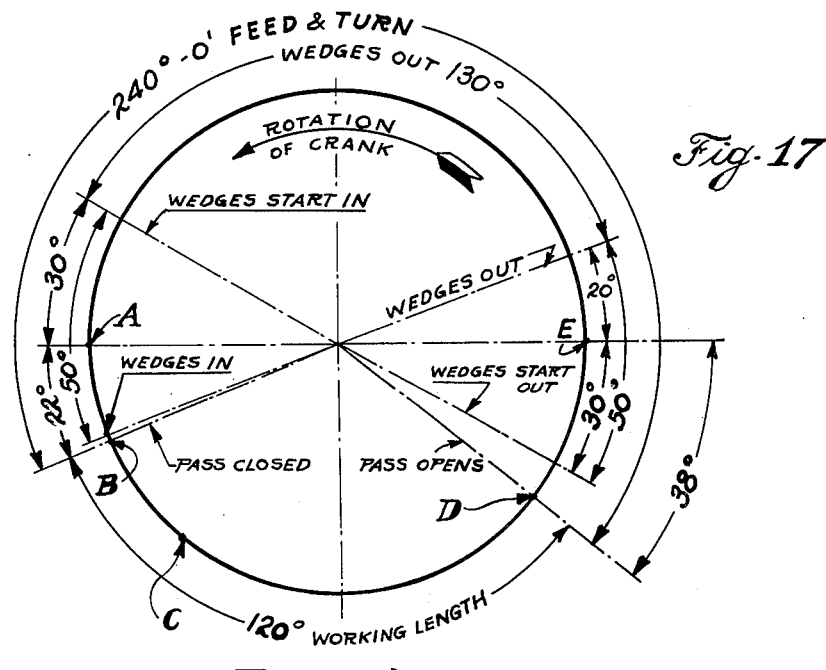
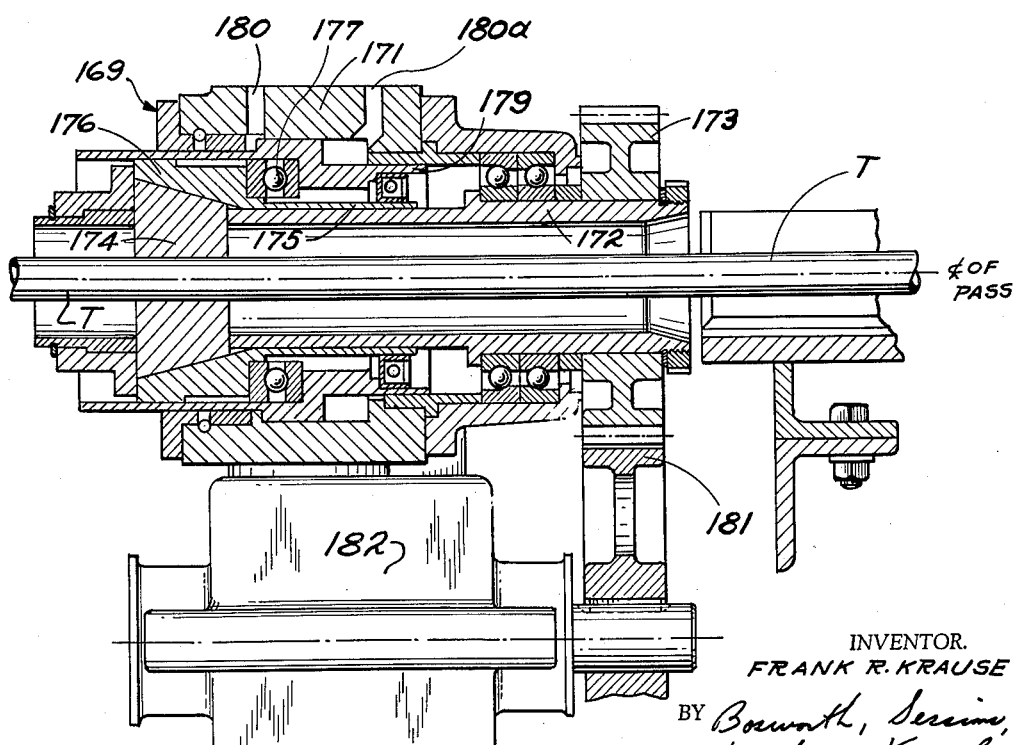

April 24, 1962　　　F. R. KRAUSE　　　3,030,835
TUBE ROLLING MACHINE
Filed June 6, 1958　　　　　　　　　　13 Sheets-Sheet 13
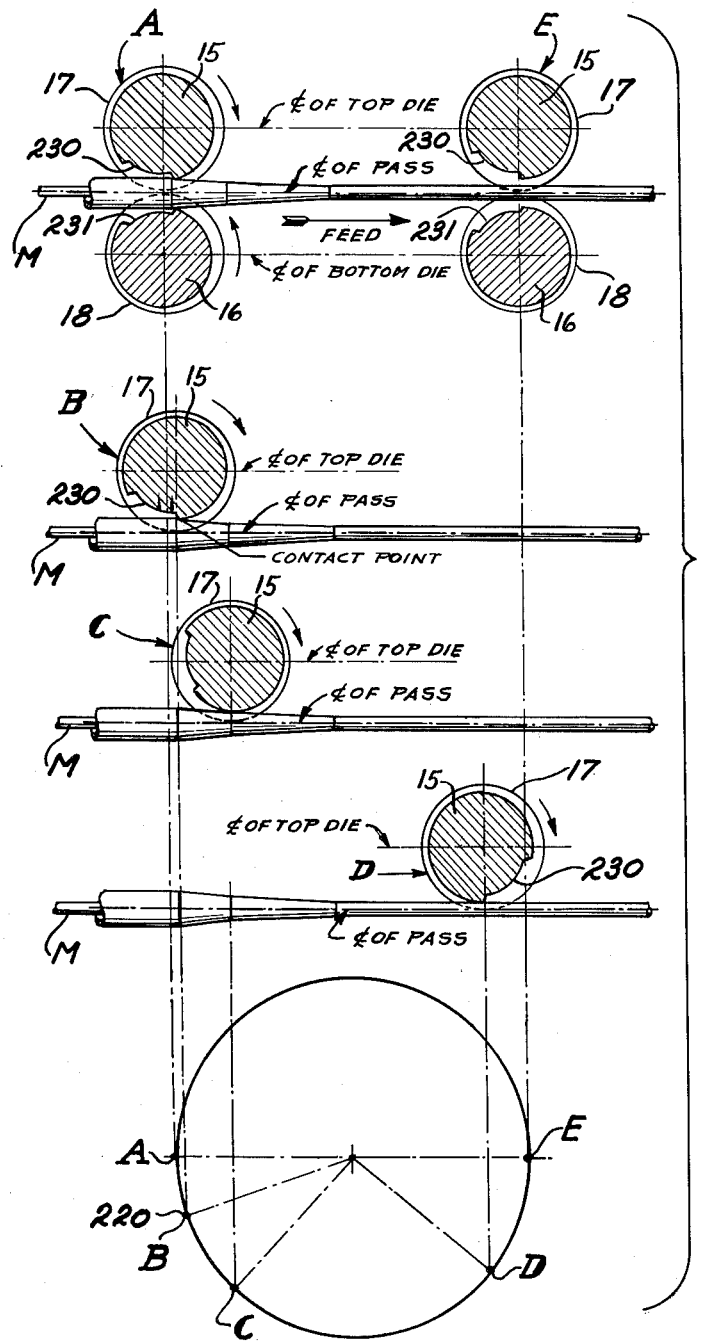
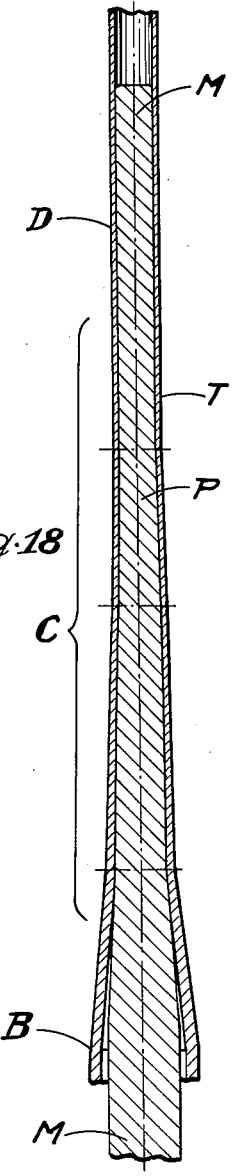
Fig. 18
Fig. 19
INVENTOR.
FRANK R. KRAUSE
BY
ATTORNEYS

United States Patent Office 3,030,835
Patented Apr. 24, 1962

3,030,835
TUBE ROLLING MACHINE
Frank R. Krause, New Castle, Pa., assignor, by mesne assignments, to Blaw-Knox Company, Pittsburgh, Pa., a corporation of Delaware
Filed June 6, 1958, Ser. No. 740,248
13 Claims. (Cl. 80—14)

This invention relates to tube rolling mills in which a tubular workpiece is rolled on a mandrel by grooved die rolls in order to elongate the workpiece and to reduce its wall thickness and diameter.

Machines of this general type are well known. They comprise a roll supporting saddle which is reciprocated on a horizontal frame by a drive mechanism. The saddle carries die rolls having opposed grooves adapted to do work on a tube blank or shell or similar workpiece interposed between the rolls. As the saddle reciprocates, the rolls are rotated by engagement between gears mounted on the rolls and racks mounted on the frame on which the saddle reciprocates. A mandrel is provided which extends into the space within the grooves of the rolls and which functions to support the workpiece during the rolling operation and to control the internal diameter of the tube leaving the apparatus. Means are provided to advance and retract the mandrel so that tube blanks can be placed on the mandrel, it being necessary to stop the operation of the machine when a tube blank is to be loaded on the mandrel.

In operation, the tube being rolled is intermittently advanced through the rolls by means of a carriage which pushes the tube through the roll pass, and the tube is grasped by chucks, clamps or the like to rotate it intermittently. The grooves in the die rolls are arranged so that they are disengaged from the tube at each end of the stroke of the saddle. During the time of disengagement of the dies when the saddle is near the inlet end of the machine, the work is advanced a slight distance; during the time that the tube is disengaged by the dies when the saddle is toward the discharge end of the machine, the tube is rotated through a fraction of a turn, for example, 60 degrees. The die rolls engage the work on both the forward and return strokes. Obviously, with such an arrangement, if the machine is operated rapidly, there is very little time for carrying out the advancing and rotating operations.

The general objects of the present invention are the provision of an improved tube rolling machine having advantages over the prior art machines described above, the provision of a more reliable and more accurate tube rolling machine, the provision of a tube rolling machine having increased production as compared to existing machines, and the provision of a tube rolling machine which has the ability to produce improved product as compared to existing machines.

More specific objects of the invention include the provision of a tube rolling machine in which means are provided for continuously feeding tubular blanks to the machine so that the machine can be operated for long periods of time without being stopped; the provision of a machine in which a plurality of blanks can be operated upon at once; the provision of a machine embodying a plurality of mandrels which can be reloaded individually without stopping the machine; the provision of a tube rolling machine in which the rolling forces imposed on the die rolls are transmitted through backup rolls to stationary backup or thrust plates; the provision of a tube rolling machine in which the die rolls are disengaged from the tube near the end of each working or forward stroke of the rolls, the tube being advanced and rotated during the return movement of the rolls while the rolls are out of engagement with the tube; the provision of a tube rolling machine in which the rolling action takes place only in the direction of the movement of the tube blanks through the machine; the provision of a method of rolling tubes in which the tube blanks are rolled in only one direction; the provision of improved mechanism for supporting the mandrels in the machine; the provision of chucks arranged to advance the tubular blanks through the machine as well as to rotate them; the provision of a machine and method for rolling tubular blanks by means of reciprocating rolls embodying small diameter, backed up working rolls with tapered die grooves extending substantially more than half of the circumference of the rolls; the provision of a method and apparatus for rolling tubular blanks in which the die grooves in the rolls are designed with respect to the mandrel so that the blank is rolled by first sinking its diameter until the interior surface of the blank comes into contact with the mandrel, then continuing the rolling operation to reduce the wall of the tube to a desired gauge and to further reduce the diameter of the tube, and the provision of a method and apparatus for rolling tubular blanks in which the draft of the rolls is diminished relative to the progressively diminishing wall thickness of the blank so as to maintain the percentage of reduction of wall thickness substantially constant throughout the conical portion of the pass.

Further objects and advantages of the invention will become apparent from the following description of a preferred form thereof, reference being made to the accompanying drawings. The essential characteristics of the invention are summarized in the claims.

Referring now to the drawings, FIGURES 1, 1a and 1b together constitute a plan view of the complete machine.

FIGURES 2 and 2a together constitute a side elevation of the machine shown in FIGURES 1, 1a and 1b.

FIGURE 3 is a longitudinal vertical sectional view illustrating the mill housing, the saddle for supporting the rolls and the main drive mechanism on an enlarged scale.

FIGURE 4 is a transverse sectional view through the mill rolls on an enlarged scale, the section being taken along the line 4—4 of FIGURE 3.

FIGURE 5 is a central longitudinal section, the view being taken from the side opposite the view shown in FIGURE 3, the section being taken on the plane indicated by line 5—5 of FIGURE 4, and being on an enlarged scale.

FIGURE 6 is a longitudinal fragmentary sectional view showing a portion of the main drive mechanism and mechanism for releasing the pressure on the working rolls during the return stroke of the mill.

FIGURE 8 is a top plan view on an enlarged scale of one of the cross heads for advancing the tube blanks through the mill.

FIGURE 9 is a view taken as indicated by line 9—9 of FIGURE 8.

FIGURE 11 is a view similar to FIGURE 10 but showing the tube rotating chuck disposed on the delivery end of the roll mill housing.

FIGURE 12 is a somewhat diagrammatic plan view illustrating the mechanism for driving the tube advancing and rotating chucks.

FIGURE 13 is a vertical view taken as indicated by line 13—13 of FIGURE 12.

FIGURE 14 is a transverse sectional view illustrating one of the mandrel locking mechanisms.

FIGURE 15 is a vertical sectional view taken as indicated by line 15—15 of FIGURE 14.

FIGURE 16 is a view similar to FIGURE 15 but showing the mechanism in mandrel engaging position.

FIGURE 17 is a diagram showing the operating cycle of the machine.

Figure 7:
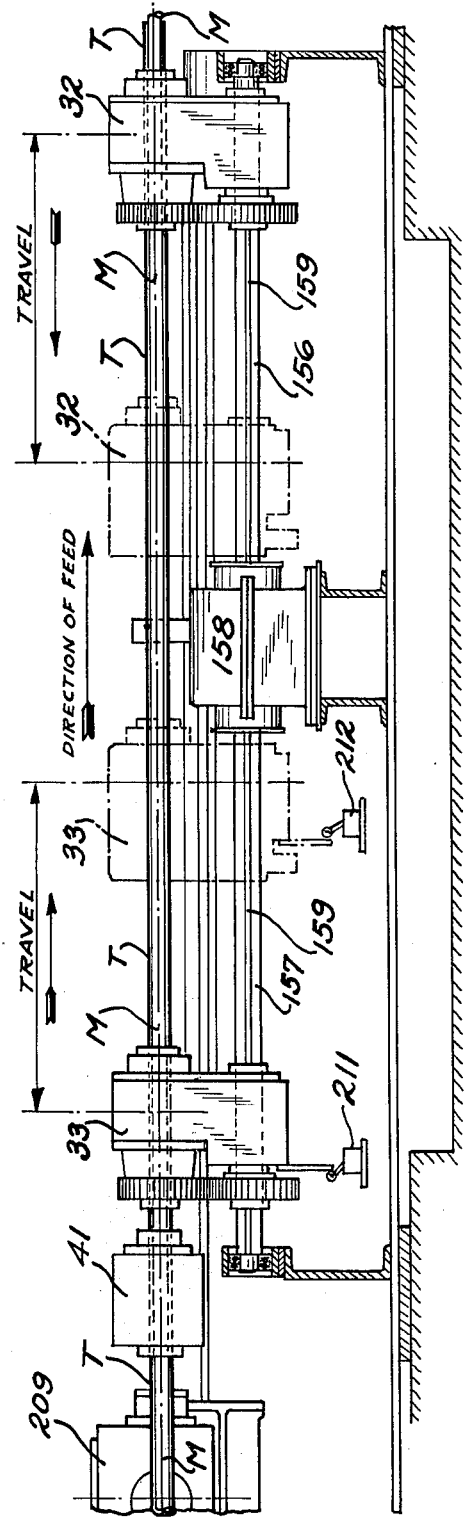
FIGURE 7 is a side elevational view on an enlarged scale showing the tube and advancing and rotating mechanism.

FIGURE 18 diagrammatically illustrates the position of the die rolls at various points in the cycle, and FIGURE 19 illustrates the manner in which the tube is reduced by the die rolls in cooperation with the mandrel.

*General arrangement.*—The general arrangement of the machine is illustrated in FIGURES 1, 1a, 1b, FIGURES 2 and 2a and the enlarged views constituting FIGURES 3 and 4. The machine comprises a mill housing indicated in general at 10 within which a saddle 11 is supported for reciprocation upon rollers 12 that operate upon tracks 14 (see FIGURES 3 and 4). The saddle 11 carries working or die rolls 15 and 16 which are provided with a plurality of die recesses or grooves 17 and 18, respectively, so that the rolls can work simultaneously on a plurality of tubular blanks T.

The working or die rolls 15 and 16 are supported by backing up rolls 20 and 21. These rolls are supported by thrust plates 22 and 23, respectively. The backing plates 22 and 23, in turn, are supported by movable wedges 24 and 25; when the wedges are withdrawn, the working rolls move apart and disengage themselves from the tubes T.

The saddle is reciprocated on its tracks by means of the main drive mechanism indicated in general at 27 and disposed at the exit or discharge end of the machine. The main drive mechanism includes cranks 28 which are disposed on either side of the pass line and are connected to the saddle by connecting rods 29. The cranks are rotated in the direction of the arrow in FIGURE 3 at speeds of the order of 80 to 100 revolutions per minute, although this may be varied throughout a considerable range. Reciprocation of the saddle causes the working or die rolls 15 and 16 and the backup rolls 20 and 21 to rotate, positive rotation of these rolls being insured by the provision of racks and pinions as will appear below. The tubes or workpieces T are fed in from the left in the arrangement shown in the drawings and are discharged to the right. The working stroke of the die rolls 15 and 16 takes place as the saddle moves from left to right. Hence, the connecting rods are in tension during each working or forward stroke when the load upon them is greatest. The workpieces are supported during the rolling operation by mandrels M having tapered points P, see FIGURE 19, which extend throughout the working zone so that the tube is properly supported during the rolling operation.

The wedges 24 and 25 are withdrawn at the end of each working stroke of the saddle 11 and replaced at the end of each return stroke by means of the wedge mechanism indicated in general at 31 and shown particularly in FIGURE 6, so that no work is done upon the tube when the saddle and the rolls are on their return stroke. During the return stroke the tubes are intermittently advanced through the machine and are rotated a fraction of a revolution by chucks carried by cross heads 32 and 33 disposed on the entry side of the machine. These cross heads are moved in opposite directions along the frame of the machine by feed screws 34 and 35; the direction of rotation of the feed screws is periodically reversed, so that the cross heads alternately approach and withdraw from each other. Each cross head carries the same number of chucks as the number of tubes upon which the machine is arranged to act; three, in the present example. During the period that the cross heads are moving toward each other, cross head 33 moves toward the mill housing 10 and cross head 32 moves away from the mill housing. During this period, the chucks in cross head 33 grasp the tube blanks, while the chucks in cross head 32 are released from the tube blanks. During the return stroke of the saddle, the cross head 33 is advanced a fraction of an inch toward the mill housing, thus advancing the blanks. At the same time the chucks in both cross heads are rotated, thereby rotating the tubular blanks with respect to the dies.

After the cross heads have approached each other to a predetermined distance, their direction of movement is reversed by reversing the feed screws. Then cross head 32 moves toward the mill housing 10 while cross head 33 moves away from the mill housing 10. During this phase of the operation the chucks in cross head 32 grasp the tubes to advance and rotate them while the chucks in cross head 33 are released from the tube.

Figure 10:
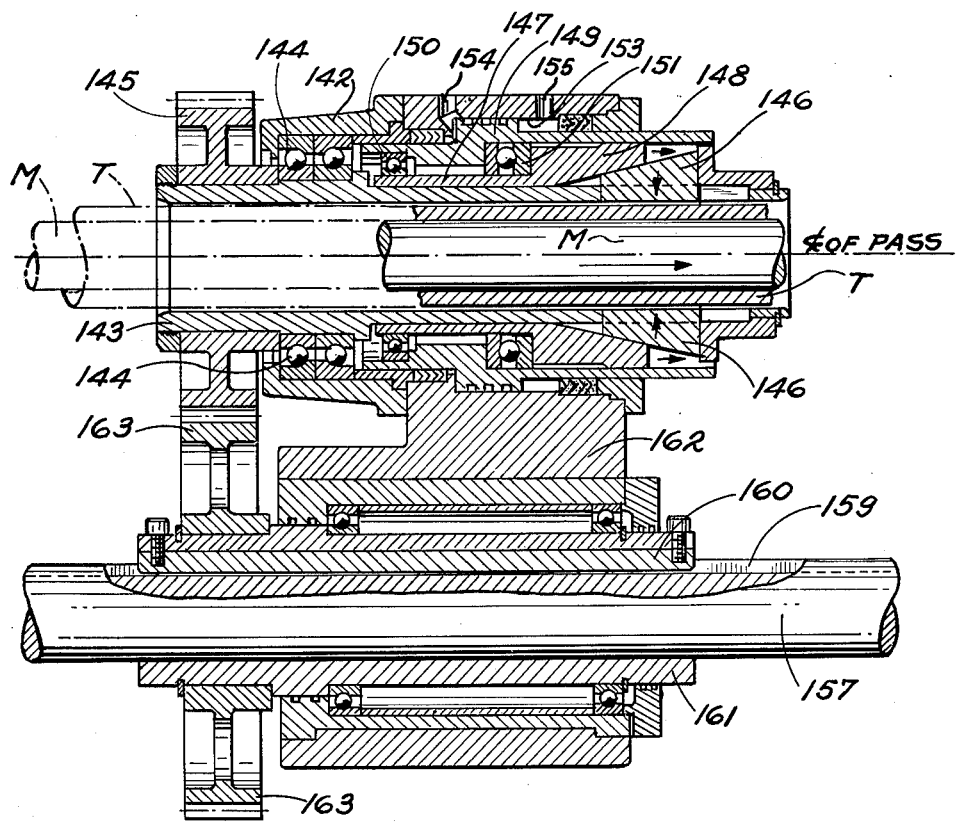
FIGURE 10 is an enlarged vertical sectional view taken as indicated by line 10—10 of FIGURE 8.

In order to insure the rotation of the tubes after they are no longer gripped by either cross head 32 or 33, a cross head 37 is provided at the exit end of the machine. As appears in greater detail below, this cross head contains chucks which are merely rotated to rotate the tubes, the tubes sliding through the chucks as they are advanced. The cross heads 32 and 33 are moved toward and away from each other, and the chucks in all three cross heads are rotated by the chuck rotating and advancing mechanism indicated in general at 38 and to be described in detail below. The chuck rotating and advancing mechanism is shown in general in FIGURES 1a and 7, the cross head 33 is shown in FIGURES 8 and 9, one of the chucks and the drive therefor is shown in FIGURE 10, and one of the exit chucks is shown in FIGURE 11.

With this arrangement, the cross heads 32 and 33 and their associated chucks can feed workpieces to the roll stand 10 continuously if the workpieces are supplied to the cross head 33 in continuous succession. In order to accomplish this, the mandrels are supported by two spaced mandrel locks which are indicated in general in FIGURES 1 and 1a at 40 and 41 and which are shown in greater detail in FIGURES 14, 15 and 16. The mandrel locks are adapted to grasp the mandrels individually at spaced points and hold the mandrels against longitudinal movement while permitting them to rotate. When the locks are released, there is clearance around the mandrels for advancing tubes over the mandrels. Thus, if mandrel lock 40 is released and mandrel lock 41 is engaged with a mandrel to hold it against longitudinal movement, then tubular blanks can be moved onto the mandrel from the loading rack 42 which is disposed at adjacent and at approximately the same level as the rear ends of the mandrel rods. The blanks are moved into the space between mandrel locks 40 and 41, either manually or by appropriate pinch rolls or pushers (not shown) until they are engaged by pinch rolls 43; these rolls and pinch rolls 44 can be used to advance the blanks as far as possible toward mandrel lock 41. Then mandrel lock 40 is engaged with the mandrel and mandrel lock 41 disengaged therefrom. When mandrel lock 41 is opened, the pinch rolls 43 and 44 may be actuated to move the workpieces into engagement with the chucks carried by cross head 33. The apparatus is operated with mandrel lock 40 engaged with the mandrel and mandrel lock 41 disengaged until the trailing end of the last tubular blank on the mandrel has passed mandrel lock 41. Then mandrel lock 41 is engaged with the mandrel, mandrel lock 40 is disengaged from the mandrel, and one or more tubular blanks are advanced onto the mandrel and into the space between the mandrel locks 40 and 41 as before. Thus, tubular blanks can be fed onto the mandrel rods to the tube advancing and rotating cross head 33 without requiring the machine to be stopped for loading. As described below, the mandrel locks can be separately engaged with and disengaged from the several mandrels. Therefore, the machine can be operated continuously for indefinite periods of time in the production of a given size of tubing.

The tubes are guided into the working rolls by stationary inlet guides 45, and after passing through the mill the reduced and elongated tubes are guided by stationary outlet guides 46 into the chucks carried by cross head 37. After leaving these chucks, the tubes advance over racks 46a at the outlet end of the machine and between the gear housings 47 and 48 of the main drive 27. From the racks 46a the tubes travel onto the outlet rack 49. Outlet rack 49 may be many feet long because a single pass through the machine results in a great reduction in diameter and wall thickness and a correspondingly great elongation of the tube blanks fed to the machine. These tubes then progress to whatever further operations may be required. If further reduction is needed, the tubes may be fed either to a conventional draw bench or preferably to a bull block in which the tube may be reduced further in diameter, elongated to a greater degree and then coiled. The correlation of the present machine with subsequent operations forms no part of the present invention, however.

*Main drive.*—The main drive 27, which reciprocates the saddle 11, withdraws and replaces the wedges 24 and 25 and advances and rotates the tubular blanks, is illustrated in FIGURES 1a, 1b, 2a, 3 and 6. Power for these operations is furnished by an electric motor 51 (see FIGURE 1b) driving through a speed reducer 52 and air operated clutch 53 which couples the motor to the input shaft 54 of the main drive. The drive gearing is contained in the housings 47 and 48, substantially identical gearing being employed in each housing. The input shaft 54 of the housing 48 is connected by cross shaft 55 and appropriate couplings to input shaft 56 for housing 47. It will be noted that the level of the shaft 55 is beneath the level of the outlet guides 46 and that the housings 47 and 48 are spaced to provide room for the discharge of tubes from the mill.

The gearing within the drive train in each case is through an input pinion 57 on each input shaft which drives a gear 58 mounted on a countershaft 59. Countershaft 59 carries a pinion 60 which meshes with a main drive gear 61 on crank shaft 62. Each crank shaft 62 carries one of the cranks 28, the cranks being provided with massive counterbalances 63.

The drive for rotating and advancing the tubes is also taken from the main drive. This is accomplished through a coupling 64 connected to the outboard end of the crank shaft 62 within the housing 47 and to the input shaft 65 of the rotating and advancing mechanism 38, which is described in detail below.

In order to provide for withdrawing and returning the wedges 24 and 25 in timed relationship with the movement of the saddle, each crank shaft 62 has a cam 67 keyed thereto (see FIGURE 6). Each cam engages cam follower rollers 68 and 69 which reciprocate a push rod 70 that is slidably mounted in bearings 71. The push rods 70 operate the wedges in a manner described below.

The simple, reliable and sturdy drive mechanism thus furnishes power for the principal elements of the machine from a single motor. All the operations are synchronized mechanically, thus eliminating the necessity for complicated hydraulic or electric operating devices involving special timing means.

*Mill housing and saddle.*—The tubular blanks T are rolled to the desired diameter and wall thickness by the die rolls 15 and 16 which are supported in the reciprocating saddle 11 that is, in turn, mounted in the mill housing 10. These parts are shown particularly in FIGURES 3, 4 and 5. The mill housing comprises a massive frame work made up of vertically extending transverse members 72, side plates 73, bottom plate 74 and lower, vertical longitudinally extending plates 75 that directly support the wedge slide 76 on which the lower wedge 25 rests. The side plates 73 are apertured as at 77 to give access to the saddle 11.

A similar massive structure is provided at the top of the mill. This is made up of transversely extending upper vertical members 78, upper, vertical longitudinally extending plates 79 which correspond to lower plates 75 and support a top wedge slide 80 with which the upper wedge 24 is slidably engaged. A horizontal top plate 81 completes this assembly; these parts are supported by built-up socket members 82 which are secured to the side plates 73. The mill housing obviously has to be of massive construction because the working pressures of the die rolls 15 and 16 are transferred to the housing through the back-up rolls 20 and 21, the thrust plates 22 and 23, the wedges 24 and 25 and the wedge slides 76 and 80.

The mill housing 10 also supports the saddle for reciprocating movement; to accomplish this purpose the tracks 14 that are engaged by the rollers 12 are mounted on supporting plates 83 secured to the side plates 73 and additionally supported by vertical members 84 extending upwardly from the bottom plate 74. In order to eliminate any likelihood of the rollers 12 sliding on the tracks 14, the rollers are constrained to rotate as the saddle reciprocates by gears 85 which mesh with racks 86 that are also carried by the track supports 83.

The rollers 12 are carried by suitable bearings mounted in the side frame members 88 of the saddle 11. The saddle side frames are of generally U-shaped arrangement and are tied together by lower transverse members 87 (see FIGURE 5) and by upper tie rods 90. The legs of the U-shaped side plates provide guides for the bearing blocks 91, 92, 93 and 94 which carry the working rolls 15 and 16 and the back-up rolls 20 and 21, respectively, and which are slidable in the recesses in the side plates. It will be noted that while the saddle is rigidly constructed, it is not nearly as massive as the mill housing 10. The reason for this is that the saddle is not required to resist the rolling forces that tend to spread the working rolls 15 and 16 apart. These forces are transmitted by the back-up rolls 20 and 21 to the upper and lower thrust plates 22 and 23 and thence to the mill housing as explained above.

In order to insure proper rotation of the rolls, the upper thrust plate 22 carries racks 96 that engage pinions 97 on the upper back-up roll 20. These pinions, in turn, engage pinions 98 on the upper working roll 15. A similar arrangement consisting of racks 99 and pinions 100 and 101 is employed for driving the lower rolls 16 and 21. The pinions 98 and 101 that drive the working rolls have pitch diameters that are approximately equal to the pitch diameters of the roll grooves 17 near the finishing ends of the tapered pass. This substantially prevents slippage of the die grooves with respect to the tubes near the finishing end of the stroke and improves the characteristics and finish of the rolled tubes.

As explained above, at the end of each forward or working stroke of the saddle 11, the wedges 24 and 25 are withdrawn to relieve the pressure on the back-up rolls and working rolls. In order to move the working roll out of contact with the work when the wedges are withdrawn, two heavy springs 102 (see FIGURE 5) are disposed at either end of the working rolls in recesses in the bearing blocks 91 and 92. The springs 102 are supported by collars 103 on supporting rods 104 which are carried by the caps 105 and act between the collars 103 and flanges 106 of the bearing blocks 91. The springs are strong enough to more than counterbalance the weight of rolls 15 and 20 and thus maintain roll 15 in contact with roll 20 and roll 20 in contact with thrust plate 22. The thrust plate 22 is held in contact with the wedge 24 when the wedge is withdrawn by means of suspension rods 107 that extend through the top plate 77. Tubes 108 surround the suspension rods, and compression springs 109 act between the ends of the tubes and washers 110 that are adjustably mounted at the upper ends of the tension rods. The springs 109 more than counterbalance the weight of the thrust plate 22 and the wedge 24; thus when the wedges are withdrawn, the back-up plate 22 is maintained in contact with them and the wedge is maintained in contact with the top wedge slide 80. This prevents chattering when the wedges are withdrawn and replaced and reduces the load that would otherwise be imposed on the springs 102 that lift rolls 15 and 20.

A somewhat similar arrangement is employed at the bottom of the saddle to counterbalance in part the weight of rolls 16 and 21 and bottom thrust plate 23. As shown in FIGURE 5, sleeves 111 are supported by and extend downwardly from bottom plate 74. The ends of the sleeves are closed as shown to support compression springs 112 which act between the ends of the sleeves and plugs 113 that close the upper ends of the spring receiving openings 114 in the thrust plate 23. The springs 112 partially counterbalance the combined weights of the thrust plate 23, the back-up roll 21 and the work roll 16, and exert sufficient force to substantially reduce the load on the wedges 25 when the working rolls reach the end of their stroke and are disengaged from the tube. Therefore, the wedges can be withdrawn and replaced without undue friction, but the weight of the parts maintains contact at all times between the thrust plate 23 and the wedges 25 and between the wedges 25 and the wedge slide 76. The upper and lower springs preferably are designed so that the loads on the upper and lower wedges are of the same order at the ends of the stroke of the saddle where the die rolls 15 and 16 are relieved so that the rolls do not engage the tubes.

In order to move the wedges 24 and 25 in and out in timed relationship with the reciprocation of the saddle, the individual wedge members making up the wedge 24 are connected to an upper cross member 117 (see FIGURES 3 and 6), each end of which is engaged by a connecting rod 118, substantially identical mechanisms being provided on each side of the machine, one of the mechanisms being shown in FIGURE 6. Connecting rod 118 is supported in a guide 119 and at its end carries a pin 120 which rests in the slotted end 121 of a rocking lever 122. Lever 122 is mounted on a transversely extending rock shaft 123, and the lower end of the lever is reciprocated by engagement with the collar 125 on the end of the push rod 70 which, as described above, is reciprocated by one of the cams 67.

A similar arrangement is employed for actuation of the bottom wedge 25. The individual wedge members are secured to a cross member 127, each end of which is pivotally connected to a connecting rod 128 that is pivotally connected to the lower end 129 of a lever 130. Lever 130 is pivoted on a shaft 131, and the upper end of the lever is in engagement with collar 125 so that lever 130, like lever 122, is rocked when the push rod 70 is reciprocated by the cam 67 acting through the cam followers 68 and 69. When the push rod is moved to left in the arrangement shown in FIGURE 6, the wedges are withdrawn by movement of the connecting rods 118 and 128 to the right; the wedges are replaced when the push rod is moved to the right by the cam. These movements take place, respectively, at the ends of the working and return strokes of the saddle. Thus, by the mechanism described, the wedges are removed and replaced in accurately timed relationship with the movement of the saddle by reliable and simple mechanical connections which are driven directly from the main drive through the crank shafts 62.

*Tube advancing and rotating mechanism.*—As described above, the wedges are withdrawn and the working rolls 15 and 16 move out of engagement with the work at the end of each forward stroke of the saddle, and the wedges are replaced and the rolls moved into working position at the end of each return stroke. During the period that the working rolls are disengaged from the tube, the tubes are advanced through the apparatus and rotated a fraction of a turn by mechanisms shown in FIGURES 1a, 2a, 3, 7, 8, 9, 10, 11, 12 and 13. The mechanism on the entry side of the mill for feeding the tubular blanks to the mill includes the cross heads 32 and 33 and the driving mechanism therefor indicated in general at 38. Each cross head is adapted to grasp a plurality of tubes (in the present instance, three) and intermittently rotate and advance the tubes. Inasmuch as the cross heads are substantially identical, the following description of cross head 33 may be taken as applying to both.

As shown particularly in FIGURES 8 and 9, cross head 33 comprises a frame structure 133 extending transversely of the machine and supported by pads 134 that slide on tracks 135 mounted on the upper surfaces of I-beams 136 which constitute the longitudinal extending frame work of the machine. The end portions of the frame structure 133 carry nuts 137 that engage feed screws 35. Rotation of the feed screws 35 by the mechanism 38 causes the cross head to move toward or away from the mill stand 10 depending upon the direction of rotation of the screws. It is to be noted that feed screws 34, which drive cross head 32, have threads of opposite hand from the threads on screws 35 and the screws 34 and 35 are coupled together so that rotation of the feed screws always moves the cross heads 32 and 33 in opposite directions. The intermittent rotation of the feed screws by the mechanism 38 furnishes the advancing motion for the tubular blanks which are advanced a fraction of an inch during each return stroke of the saddle.

In order to grasp the tubes to advance them with the cross head, as well as to rotate the tubes, the cross head carries three chucks 138, 139 and 140, through which the tubes T and mandrels M extend. The chucks are of substantially identical consstruction, chuck 139 being shown on an enlarged scale in FIGURE 10. The chuck 139 comprises a body portion 142 that supports a central tubular guide 143 by means of appropriate bearings 144. A gear 145 is fixed to the rearwardly projecting portion of the tubular guide 143 so that the guide may be rotated. At its forward end the tubular guide carries segmental tube gripping wedges or fingers 146 that are arranged to be cammed inwardly to grip the tube or to be released to permit the tube to move therethrough, the apparatus being shown in released position in FIGURE 10.

In order to actuate the wedges to cause them to grip a tube within the chuck, a sleeve 147 having an enlarged end 148 with a conical surface that constitutes a camming ring is disposed on the exterior of the tubular guide 143. The sleeve 147 is moved axially of the chuck to cam the gripping wedges inwardly or to release them by an annular piston 149 which supports the sleeve 147 for rotation by means of bearings 150 and 151 the piston 149 operates within a cylinder 153 formed within housing 142. When air or other fluid under pressure is admitted to the inlet port 154, the piston is advanced to cause the camming ring 148 to move the wedges inwardly to grip a tube disposed within the chuck. When air or other fluid is admitted to the port 155, the piston and the camming ring are retracted, thus releasing the wedges from the tube. The direction of movement of the tube through the chuck, as indicated by the arrow, tends to cause the wedges to release their grip on the tube. The mechanism is arranged with appropriate controls so that when the cross head 33 is being advanced toward the roll stand 10, fluid under pressure is supplied to the port 154; when the cross head is moved away from the roll stand, fluid under pressure is supplied to port 155. Thus, during advancing movement of the cross head, the chucks grasp the tubes within them to move the tubes toward the mill housing while the chucks are released from the tubes during retracting movement.

In order to rotate the tubes, the intermittent drive mechanism 38 that rotates the feed screws 34 and 35 also intermittently rotates the longitudinally extending centrally disposed shafts 156 and 157; shaft 156 is engaged by cross head 32, and shaft 157 is engaged by cross head 33. Both shafts are rotated simultaneously and in the same direction by the mechanism 38 through gearing, which may take any conventional form, in housing 158. As shown in FIGURES 7, 10 and 12, the shafts are provided with keyways 159 which extend throughout substantially their entire lengths. The keyway 159 is engaged by a key 160 secured to a sleeve 161 which is rotatably mounted in the depending portion 162 of the cross head 33. A gear 163 is keyed to the sleeve 161. Gear 163 meshes with gear 145 on the tubular guide 143 of chuck 139, and gear 145 meshes with corresponding gears 164 and 165 of chucks 138 and 140 (see FIGURE 8). Thus rotation of the shafts 156 and 157 by the mechanism 38 when the saddle is on its return stroke results in the rotation of all of the chucks in cross heads 32 and 33 and rotation of the work gripped by the chucks.

Inasmuch as the trailing ends of the tubular blanks pass beyond the chucks on the entry side of the mill some time before the blanks have passed through the mill, and inasmuch as it is desirable to rotate the blanks between each working stroke, the cross head 37 (see FIGURES 1a, 3 and 11) is provided at the exit side of the mill housing to accomplish this rotation. Cross head 37 is generally similar to cross heads 32 and 33, except that it is stationary, being mounted on transverse frame members 167 just beyond the outlet guides 46. The chucks also are faced in the opposite direction, and the gripping jaws of the chucks are arranged to grasp a tube of much smaller diameter than the chucks in cross heads 33 and 32 because the tube has been greatly reduced and elongated in its passage through the apparatus.

The cross head contains three substantially identical chucks 168, 169 and 170 (see FIGURE 1a), the chuck 169 being shown on an enlarged scale in FIGURE 11. As there shown, the chuck comprises a housing 171 which rotatably supports inner guide sleeve 172 that carries gear 173 and segmental gripping fingers or wedges 174. A sleeve 175 surrounds the guide 172 and carries a camming ring 176 adjacent the gripping wedges 174. The sleeve is actuated through bearings 177 by an annular piston 179, fluid to clamp the wedges against a tube being admitted through port 180a and fluid to release the wedges being admitted through port 180. The sleeve 172 and the gripping wedges 174 are rotated by gear 173 which is engaged by gear 181 that is driven through appropriate gearing in the gear box 182 by the drive mechanism 38. Gear 173 meshes with gears 183 and 184 on chucks 168 and 170, respectively, so that all of the chucks are rotated simultaneously and in synchronism with the rotation of the chucks carried by the cross heads 32 and 33.

Since the cross head 37 is stationary, the grip of the wedges 174 on the tube T, while it is sufficient to rotate the tube, is not so strong but that the tube can be pushed through the fingers without requiring them to be released and without undue friction or wear on the tube. Thus, during normal operation of the device, the wedges 174 simply remain in rather light gripping engagement with the relatively small diameter tube.

The drive mechanism for rotating and advancing the cross heads is indicated in general at 38 and is illustrated particularly in FIGURES 1a, 12 and 13. As explained above, power for the mechanism 38 is obtained from the main drive 27, through shaft 62, coupling 64 and input shaft 65. Input shaft 65 drives an intermittent motion unit 184 which is arranged to convert the continuous rotation of the input shaft 65 into intermittent rotation of the line shaft 185 which extends at right angles to shaft 65 and parallel to the longitudinal axis of the machine. The intermittent mechanism 184 preferably takes the form of a roller gear mechanism in which the driving element is a cam that engages rollers on the driven shaft. Mechanisms of this type are well known, a Ferguson roller gear unit No. P-H-3, manufactured by Ferguson Machine Corporation of St. Louis, Missouri, being satisfactory, but any appropriate intermittent motion device such as a Geneva motion apparatus may be employed if desired. In a preferred form of machine, the line shaft rotates 60° for each complete revolution of the input shaft 65; this rotation of the line shaft takes place entirely within the period the die grooves in the working rolls are out of engagement with the tubes; this period corresponds to about 240° of rotation of shaft 65.

The line shaft 185 drives transverse shafts 186 and 187 through bevel gear units 188 and 189 and also drives a reversing gear unit 190. Shaft 186 drives gear 181 through bevel gear unit 182, and in this manner the chucks 168, 169 and 170 in the outlet cross head 37 are rotated. The chucks 138, 139 and 140 in cross heads 32 and 33 are rotated in synchronism with the chucks 168, 169 and 170 in cross head 37 by the shaft 187 acting through a bevel gear unit 192 which drives the shafts 156 and 157 that rotate the chucks in cross heads 32 and 33, as described above. The amount of rotation of the chucks and of the tubes is determined by the ratios of the gearing in the bevel gear units 188, 189, 182 and 192. In the embodiment shown, the chucks and the tubes are rotated about 75° during each return stroke of the saddle.

At the same time that the tubes are being rotated, they are also being advanced by the cross heads 32 and 33. This is accomplished by means of the reverse gear mechanism 190. Mechanism 190 comprises a spur gear 193 mounted on the end of the line shaft; gear 193 drives a gear 194 which is keyed to a countershaft 195. Countershaft 195 carries oppositely disposed bevel gears 196 and 197, which are mounted for free rotation on the shaft 195. Both of these gears mesh with a bevel gear 198 that drives a transverse shaft 199.

Shaft 195 also carries a jaw clutch element 200 that is slidably mounted on the shaft and is arranged in one position to make driving engagement with jaw clutch elements 201 carried by gear 196 and in the other position to engage clutch elements 202 carried by gear 197. The clutch element 200 is shifted from one position to the other by a shifter fork 204 that is pivotally mounted as indicated at 205 and is actuated by a rod 206 controlled by an air cylinder 207. Thus, in one position of the air cylinder, the jaw clutch element 200 engages and drives gear 196; in the other position it drives gear 197, thus reversing the rotation of shaft 199.

Shaft 199 drives the feed screws 35 through bevel gear units 209 and 210, and feed screws 34 are coupled directly to feed screws 35. When shaft 199 is rotated in one direction, the feed screws operate to move the cross heads 32 and 33 toward each other; when it is rotated in the opposite direction, the cross heads move away from each other. By means of limit switches shown diagrammatically at 211 and 212 in FIGURE 7, the direction of the cross heads is reversed by actuation of the air cylinder 207 when the cross heads are in their farthest apart position as shown in full lines in FIGURE 7 and again when the cross heads approach closest to each other as shown in broken lines in FIGURE 7. At the same time, through appropriate solenoid valves also controlled by the limit switches, the fluid pressure connections to the cylinders 153 of the chucks in both cross heads are reversed so that when the cross heads are moving from their extreme separated position toward each other, the chucks in cross heads 33 are clamped on the tubes and the chucks in cross heads 32 are released. When the movement of the cross heads is reversed, the chucks in cross head 32 are clamped to engage the tubes and the chucks in cross heads 33 are released. Thus, the tubes within the chucks are moved only in a direction toward the mill stand, although the cross heads alternately approach toward and recede from the mill stand 10. The gearing is co-ordinated with the pitch of the screws 34 and 35 so that the desired advance is obtained. In a typical machine, the advance may be of the order of ¼" for each stroke of the machine. The amount of the advance can be varied by changing the ratio between gears 193 and 194 in the reversing mechanism 190.

*Mandrel locks.*—In order to make it possible to feed tubular blanks continuously to the cross heads 32 and 33 that advance the tubes into the mill, the mandrel rods M are held against longitudinal movement by mandrel locks 40 and 41 which, as explained above, alternately hold the mandrels in position and permit tubular blanks to be passed through them. These devices are shown in FIGURES 1, 1a, 2, 7, 14, 15 and 16. As shown particularly in FIGURES 1 and 2, the mandrel locks are supported on the frame members or I-beams 136 which constitute the frame of the machine. Mandrel lock 40 is at the entry end of the machine adjacent the loading rack 42, while mandrel lock 41 is located near the extreme limit of movement of the cross head 33 away from the mill housing 10. The mandrel locks are of substantially identical construction; therefore, only the mandrel lock 40 is described in detail herein. The mandrel lock consists of a transverse member 210 that is mounted on vertical members 211 that are set into and rigidly secured to the beams 136. The transverse member 210 is provided with three bores 212 within which the mandrel clamping mechanisms are disposed; these are identical and one of them is shown in FIGURES 15 and 16.

As shown in the drawing, each mandrel clamping mechanism comprises a sleeve 214 mounted within an opening in an inwardly extending flange 215 at the rear of the cross member 210. The sleeve is concentric with the bore 212 and provides an annular fluid pressure cylinder 216 within which an annular piston 217 operates. Appropriate packing is provided on the piston as shown. When air or other fluid under pressure is admitted to the cylinder 216 through the port 218, the cylinder is moved to the right in the arrangement shown in the drawing (i.e., toward the mill housing); when fluid under pressure is admitted to the port 219, the piston is moved in the opposite direction. In order to clamp the mandrel rod and hold it against longitudinal movement, segmental clamping jaws 220 (four jaws are employed in a preferred form of the apparatus) are mounted in openings in the sleeve 214. Jaws 220 have tapered outer surfaces 221 which engage the conical inner surface 222 on the piston 217. The engaging surfaces of the jaws 220 and the piston 217 are preferably dove-tailed so that when the piston is moved to the left in the arrangement shown in the drawing, the jaws 220 are positively moved outwardly. A thrust ring 224 is carried by the end of sleeve 214 to retain the clamping jaws 220 in position against the thrust exerted by the tension of the mandrel rod M.

In order to make engagement with the mandrel rod, the clamping jaws 220 are provided with teeth 225 which engage grooves 226 in the mandrel rod. The teeth are slightly tapered as shown, and the walls of the grooves 226 are correspondingly slightly tapered to facilitate entry of the teeth into the grooves and disengagement of the teeth from the grooves. The jaws are shown in released position in FIGURE 15 and in clamping position in FIGURE 16. It will be noted that with the jaws retracted as in FIGURE 15, there is clearance space between the mandrel and the interior of the sleeve 214, so that a tube can be passed through the clamping mechanism and over the mandrel. Once the tube is beyond the jaws 220, the jaws can be moved into clamping engagement with the mandrel as shown in FIGURE 16.

Preferably, the controls are arranged so that the clamping devices in each cross member can be individually controlled, but it is preferred that interlocks be provided so that both clamps on the same mandrel cannot be inadvertently released at the same time.

*Cycle of operations.*—The cycle of operation of a preferred machine embodying the invention is illustrated diagrammatically in FIGURE 17, and the arrangement of the die grooves in the working rolls and of the mandrel is shown in FIGURES 18 and 19. FIGURE 17 illustrates the operations that take place at specified positions of the cranks 28. As shown in the diagram, 30° before the cranks reach dead center toward the discharge end of the machine, i.e., 30° before the saddle reaches the end of the working stroke, the wedge mechanism 31, actuated by the cams 67, begins to withdraw the wedges 24 and 25. The wedges are completely withdrawn by the time the crank has reached a point 20° beyond dead center on the return stroke. For the next 130°, the wedges are completely withdrawn and the rolls 15 and 16 are moved out of contact with the work. The wedges begin to move into working position 30° before dead center at the end of the return stroke, i.e., 30° before the saddle reaches the end of the return stroke; this motion is completed and the rolls 15 and 16 restored to working position 20° after the crank has reached dead center. Thus, the cranks rotate through 230° from the time the wedges are started out until the wedges are completely replaced to hold the working rolls in position for operating on the tubes. The wedges then remain in place for 130° of the forward or working stroke before they are again withdrawn.

The positions of the working rolls at various positions of the cranks are shown in FIGURE 18. At position A, the rolls 15 and 16 are at the beginning of a working stroke with the cranks at dead center. In this position, the rolls are separated slightly because the wedges have not been reinserted completely. It will also be noted that the die grooves 17 and 18 in both rolls are relieved as at 230 and 231, and that the relieved portions of the grooves are adjacent the tubes so that there is no working load on the rolls during the time that the wedges are being replaced.

The upper roll 15 only is shown in positions B, C and D; the lower roll 16 takes corresponding positions immediately beneath it. In position B, which is about 22° beyond dead center, the saddle has started on the working stroke, the wedges have been inserted all the way so that the roll is tangent to the pass line, and the working portion of the groove 17 is just coming into engagement with the tube, the relieved portion 230 having rotated away from the point of tangency. At C, the roll is in an intermediate position and in working engagement with the tube. Position D shows the end of the actual working stroke of the roll; the relieved portion 230 of the groove 17 has just come to the point of tangency so that the working pressure of the roll on the tube is relieved. During the remaining portion of the forward travel, the wedges are being withdrawn. At dead center, they are partially withdrawn and the rolls are slightly spaced apart as shown at E. Shortly after the beginning of the return stroke of the saddle, the wedges are entirely withdrawn. Thus, from position D to position B, both rolls are both out of contact with the tube so that a space of approximately 240° of crank travel is available to carry out the feeding and turning operations, the actual working stroke occupying about 120°. While the actual working stroke of the machine is only about 120°, it will be noted that the small diameter work rolls 15 and 16 are in working engagement with the tube for more than 270° of the circumference of the work rolls; the relieved portions 230 and 231 occupy only about 60° of the circumference of the work rolls.

The relationship between the tube and the mandrel during the rolling operation is shown in FIGURE 19. Initially, the tube has a greater internal diameter than the external diameter of the mandrel. The first action of the die rolls is to sink the tube into engagement with the mandrel; this action begins at point B. For the rest of the working stroke, the rolling operation continues in order to reduce the wall of the tube to the desired gauge and to reduce the diameter of the tube to the desired size. This operation is carried out through the zone indicated in general at C. The tapers of the mandrel and the tube are correlated so that the draft of the rolls is diminished as the wall thickness of the blank is diminished so as to maintain the percentage of reduction of wall thickness substantially constant throughout the conical portion of the pass. In a preferred form of apparatus, the percentage reduction preferably is maintained at approximately 30 percent as the rolls progress along the tube and mandrel, it being understood that the percentage of reduction can be changed depending upon the material which is being rolled. At the end of the zone C the groove is cylindrical for a short distance, and the mandrel continues in cylindrical shape beyond the point D, where the working engagement of the rolls and tube ceases. This provides a smooth external and internal surface on the tube.

*Summary of operation.*—In placing the machine in operation, tubular blanks T are loaded from the loading rack 42 onto the mandrels M with the mandrel lock 40 disengaged from the mandrels and the mandrel lock 41 engaged with the mandrels. The blanks are advanced into the space between the two mandrel locks by means of the pinch rolls 43 and 44 which may be of any conventional construction. Then mandrel lock 40 is engaged with the mandrels and mandrel lock 41 released. The feeding of the tubes is continued, by means of the pinch rolls, through mandrel lock 41 and through the chucks carried by cross heads 33 and 32, the chucks being in their released position. The blanks T are advanced through the stationary inlet guides 45 until their leading ends are near the position taken by the working rolls 15 and 16 at the rearmost position of the saddle 11. The machine is then put into automatic operation. Assuming that the cross heads are in the positions shown in FIGURE 1a, the chucks in cross head 33 are engaged with the tube and the chucks in cross head 32 are released. The main drive is started, the saddle reciprocates, and the tubes are advanced intermittently into the bite of the working rolls with each reciprocation of the saddle.

The rolling action of the working rolls over the tube results in the reduction and elongation of the tube as described above. The working rolls 15 and 16 engage the tube only on the forward or working stroke of the machine. Near the end of the forward stroke, the relieved portions 230 and 231 are adjacent the tubes, the operation of withdrawing the wedges 24 and 25 is begun and the working rolls begin to separate and are disengaged from the tubes by the action of gravity on the lower rolls and the springs 102 and 109 on the upper rolls. The withdrawal of the wedges and separation of the rolls 15 and 16 is completed during the early part of the return stroke.

During the time that the rolls are disengaged from the tube, the intermittent drive gear 184 rotates the line shaft 38 through about 60°. This rotates the screws 34 and 35 intermittently to move the cross heads 32 and 33 and advance the tubes a predetermined increment through the working zone of the machine. At the same time, the chucks carried by cross heads 32 and 33 are turned by means including shafts 137, 156 and 157, and the stationary chucks 168, 169 and 170 carried by the cross head 37 at the exit end of the working zone are turned by means including shaft 186. As the tubes pass through the working zone and are elongated, they are guided by the outlet guides 46 into the chucks 168, 169 and 170 and then pass along the outlet guide table 46a after leaving the chucks.

During ordinary operation, the mandrels are held against longitudinal movement by mandrel lock 40. The pinch rolls 43 and 44 are operated to feed tubular blanks through the mandrel lock 41 and into engagement with the chucks carried by cross head 33. At any time that there are no blanks on any given mandrel rod between mandrel lock 40 and mandrel lock 41, mandrel lock 41 is engaged with that particular mandrel and the corresponding mandrel lock in mandrel lock 40 is disengaged. Additional tubular blanks are then fed onto that mandrel from the loading rack and advanced to mandrel lock 41 by means of the pinch rolls 43 and 44. Thereafter, the mandrel lock 40 is engaged with the mandrel and the mandrel lock 41 disengaged. If the blanks are all of substantially the same length, then it will ordinarily be possible to load all three mandrel rods at the same time. However, if tubular blanks of different lengths are employed, the mandrel rods can be loaded individually without interfering with the operation of the machine; by this means, the machine can be kept operating continuously and simultaneously rolling three tubes.

The four-high mill carried by the saddle, with the working or die rolls supported by back-up rolls and thrust plates, makes it possible to employ working rolls of relatively small diameter; for example, working rolls having a diameter of 11¾" can be utilized in rolling tubular blanks having an outside diameter of 3⅛" and an initial wall thickness of about ½". In a single pass through the machine, these blanks can be reduced to an outside diameter of about 1½" and a wall thickness of about 3/16 of an inch. This is accomplished with a die groove having a working length of approximately 27" on a 10½" pitch diameter. The gears that drive the working rolls have pitch diameters of 10½" in this machine, the 10½" pitch diameter being approximately equal to the pitch diameters of the grooves in the rolls near the finishing end of the pass, the pitch diameter of the grooves being taken as the diameter of the rolls less 7/10 of the depth of the die grooves. The rolls are designed, as noted above, so that the draft of the rolls is diminished relative to the wall thickness of the blank as the rolling progresses so as to maintain the percentage of reduction of wall thickness substantially constant throughout the pass. The initial draft of the rolls at the entry of the dies is limited to a value not in excess of the maximum bite angle that can be employed without having slippage of the rolls on the material. This arrangement, coupled with the design of the roll pass, makes it possible to effect very great reductions of tubes in a single pass through the machine without any intermediate annealing and without damage to the physical structure or to the appearance of the metal. Inasmuch as the tubes are rotated between each working or forward stroke, the tubing leaving the machine is substantially round and of substantially uniform wall thickness.

Thus, the invention provides a machine and method whereby one or more tubular blanks simultaneously can be reduced in diameter and wall thickness and greatly elongated at relatively high rates of production with the production of high quality tubes. The machine is of relatively simple construction, making it trouble free in operation. The feeding mechanism makes it possible to operate the machine continuously over long periods of time with consequent economies in operation. Since the die rolls are disengaged from the tube during the return stroke, ample time is provided for rotating and avancing the tubular blanks, making it possible to operate the machine at rates as high as 100 complete reciprocations of the saddle per minute.

Those skilled in the art will appreciate that various changes and modifications can be made in the machine described herein by way of example, all without departing from the spirit or scope of the invention. The essential characteristics of the invention are defined in the appended claims.

I claim:

1. A tube rolling machine comprising a stationary mill housing; a saddle supported for reciprocation in said mill housing; a pair of die rolls mounted in said saddle for reciprocation therewith, said rolls being adapted to engage and work a tubular workpiece to reduce the diameter thereof as it is progressed between said die rolls, said saddle and said die rolls making a working stroke in one direction and return stroke in the opposite direction; a mandrel having a tapered end portion projecting into the space between said die rolls; means for intermittently advancing the workpiece in the direction of movement of said saddle during the return stroke of said saddle; means for intermittently rotating said workpiece during the return stroke of said saddle; a pair of thrust plates each mounted on said mill housing independently of said saddle for movement toward and away from said workpiece, each thrust plate cooperating with one of said die rolls which reciprocates longitudinally of said thrust plate as said saddle reciprocates, said thrust plate being adapted to positively rotate said die roll as it so reciprocates and also being adapted to transfer to said mill housing the working force of said die roll when engaged with said workpiece during the working stroke of said saddle; and means associated with each of said thrust plates and operating in timed relation to said saddle to simultaneously move each of said thrust plates and its associated die roll so that both said die rolls move toward each other to be engaged with said workpiece under pressure during the major portion of the working stroke of said saddle, and away from each other to be disengaged from said workpiece during the major portion of the return stroke of said saddle.

2. A tube rolling machine according to claim 1 in which said die rolls have tapered die recesses adapted to engage and work said tubular workpiece to reduce the diameter thereof, the diameters of the die rolls being so related to the stroke of the machine that said die recesses extend through more than 180° of the circumference of said die rolls.

3. A tube rolling machine according to claim 2 in which said die rolls are relieved so as to be spaced from the workpiece throughout the portion of the circumference that is not occupied by the die grooves and wherein the rolls are separated from each other and brought together while the relieved portions of said rolls are adjacent said workpiece.

4. A tube rolling machine according to claim 1 in which said die rolls have tapered die recesses adapted to engage and work said tubular workpiece to reduce the diameter thereof as it progresses between said die rolls and over said mandrel, and in which said tapered die recesses of said die rolls and said tapered mandrel are correlated to each other so that the draft of said die rolls is progressively diminished as the wall thickness of the workpiece diminishes so as to maintain the percentage of reduction of wall thickness substantially constant at all points throughout the working portion of the working stroke of said machine.

5. A tube rolling machine according to claim 1 in which said pair of die rolls have a plurality of sets of cooperating die recesses each adapted to engage and work a tubular workpiece to reduce the diameter thereof as it progresses between said die rolls, and a plurality of mandrels having end portions each projecting into the space between one set of die recesses, whereby a plurality of workpieces can be operated upon simultaneously.

6. A tube rolling machine comprising a stationary mill housing; a saddle supported in said mill housing for reciprocation through a working stroke in one direction and a return stroke in the other direction; a pair of die rolls mounted in said saddle for reciprocation therewith and adapted to engage and work a tubular workpiece to reduce the diameter thereof as it is progressed between said die rolls; a pair of backing rolls, each of which is mounted in said saddle in rolling contact with one of said die rolls and is adapted to positively rotate said die roll when the backing roll is rotated; a pair of opposed thrust plates each mounted on said mill housing independently of said saddle for movement toward and away from said workpiece, each of said thrust plates having one of said backing rolls associated with it in rolling contact and being adapted to positively rotate said associated backing roll as said backing roll moves along and relative to said thrust plate during reciprocation of said saddle, said thrust plate being adapted to transfer to said mill housing the working force transmitted to it through its associated backing roll from the associated die roll when engaged with said workpiece during the working stroke of said saddle; wedge means reciprocably mounted between each of said thrust plates and said mill housing; means for reciprocating said wedge means simultaneously in timed relation to said saddle, to cause each thrust plate and the die roll and backing roll associated with said thrust plate to reciprocate simultaneously in a direction transverse to the direction of reciprocation of said saddle, so that both said die rolls move toward each other to be engaged with said workpiece under pressure during the major portion of the working stroke of said saddle and away from each other to be disengaged from said workpiece during the major portion of the return stroke of said saddle; a mandrel having a tapered point disposed between said die rolls for supporting said workpiece in working relation between said die rolls; feeding means for intermittently advancing said workpiece during the return stroke of said saddle when said die rolls are disengaged from said workpiece; and means for rotating said workpiece during the return stroke of said saddle when said die rolls are disengaged from said workpiece.

7. A tube rolling machine according to claim 6 comprising means for withdrawing said wedge means near the end of the working stroke of the saddle and replacing said wedge means near the end of the return stroke of the saddle.

8. A tube rolling machine according to claim 7 having a main drive means for reciprocating said saddle, said means for withdrawing and replacing said wedge means being driven by said main drive means.

9. A tube rolling machine according to claim 8, in which said main drive means also drives said means for intermittently rotating said workpiece and said means for intermittently advancing said workpiece.

10. A longitudinally extending rolling mill through which a workpiece is advanced in a generally horizontal direction while being worked on, comprising a stationary mill housing; a saddle supported in said mill housing for generally horizontal reciprocation, through a working stroke and a return stroke, in the direction through which said workpiece is advanced; a pair of upper and lower die rolls mounted in said saddle for rotation about axes which are generally horizontal and extend transversely of the direction of advance of said workpiece, said upper die roll being mounted above said workpiece and said lower die roll being mounted below said workpiece, said die rolls being adapted to engage and work said workpiece as it is advanced through said die rolls; an upper backing roll rotatably mounted in said saddle above said upper die roll and in positive driving engagement therewith; a lower backing roll rotatably mounted in said saddle below said lower die roll and in positive driving engagement therewith; an upper thrust plate mounted in said mill housing independently of said saddle to provide a bearing surface along which said upper backing roll moves in rolling contact and in positive driving engagement as said saddle reciprocates; upper wedge means reciprocably mounted between said upper thrust plate and said mill housing; means connecting said upper thrust plate to said mill housing so that as said upper wedge means is withdrawn said thrust plate is lifted upwardly and as said wedge means is introduced said thrust plate is moved downwardly, while being at all times held in contact with said wedge means; a lower thrust plate mounted in said mill housing independently of said saddle and providing a bearing surface along which said lower backing roll moves in rolling contact and in positive driving engagement as said saddle reciprocates; lower wedge means reciprocably mounted between said lower thrust plate and said mill housing; means connecting said lower thrust plate to said mill housing so that as said lower wedge means is withdrawn said thrust plate moves downwardly and as said wedge means is introduced said thrust plate is moved upwardly, while being held at all times in contact with said lower wedge means; means mounted on said saddle positively urging said upper die roll against said upper backing roll and said upper backing roll against said upper thrust plate when said upper thrust plate is lifted; means reciprocating said upper and lower wedge means to simultaneously move said upper and lower thrust plates toward and away from each other in timed relation to the reciprocation of said saddle, so that both said upper and lower die rolls move toward each other to engage the workpiece under pressure during the major portion of the work stroke of said saddle, and away from each other to be disengaged from said workpiece during the major portion of the return stroke of said saddle.

11. A rolling mill according to claim 10 comprising a mandrel having a tapered point disposed between said die rolls for supporting a tubular workpiece in working relation between said die rolls; feeding means for intermittently advancing said workpiece during the return stroke of said saddle when said die rolls are disengaged from said workpiece; and means for rotating said workpiece during the return stroke of said saddle when said die rolls are disengaged from said workpiece.

12. A rolling mill according to claim 11 including drive means comprising cam means for actuating said wedge means, crank means for reciprocating said saddle, and gear means for rotating and intermittently advancing said workpiece in the timing sequence set forth in claim 11.

13. A rolling mill according to claim 11 in which each of said thrust plates has at least one rack, and in which the backing roll associated with said thrust plate has a gear engaging said rack, whereby said backing roll and its associated die roll are positively rotated by said thrust plate as said rolls move along said thrust plate during reciprocation of said saddle.

References Cited in the file of this patent

UNITED STATES PATENTS

| | | |
|---|---|---|
| 1,040,134 | Brock | Oct. 1, 1912 |
| 2,062,559 | Coe | Dec. 1, 1936 |
| 2,256,426 | Damien | Sept. 16, 1941 |
| 2,387,515 | Inslee | Oct. 23, 1945 |
| 2,780,948 | Fredriksson | Feb. 12, 1957 |